US009527004B2

(12) United States Patent
Fukuda et al.

(10) Patent No.: US 9,527,004 B2
(45) Date of Patent: Dec. 27, 2016

(54) SPRAY DRYING APPARATUS OF DEHYDRATION FILTRATE FROM DESULFURIZATION WASTE WATER, AND AIR POLLUTION CONTROL SYSTEM

(75) Inventors: Toshihiro Fukuda, Tokyo (JP); Tatsuto Nagayasu, Tokyo (JP); Seiji Kagawa, Tokyo (JP); Naoyuki Kamiyama, Tokyo (JP); Nobuyuki Ukai, Tokyo (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 419 days.

(21) Appl. No.: 14/116,073

(22) PCT Filed: May 30, 2012

(86) PCT No.: PCT/JP2012/063996
§ 371 (c)(1),
(2), (4) Date: Nov. 6, 2013

(87) PCT Pub. No.: WO2012/165508
PCT Pub. Date: Dec. 6, 2012

(65) Prior Publication Data
US 2014/0083629 A1    Mar. 27, 2014

(30) Foreign Application Priority Data

May 31, 2011    (JP) .................................. 2011-122501

(51) Int. Cl.
*B01D 1/18*  (2006.01)
*B01D 1/20*  (2006.01)
(Continued)

(52) U.S. Cl.
CPC .............. *B01D 1/20* (2013.01); *B01D 53/504* (2013.01); *B01D 53/505* (2013.01); *B01J 2/04* (2013.01);
(Continued)

(58) Field of Classification Search
None
See application file for complete search history.

(56) References Cited

U.S. PATENT DOCUMENTS 2,670,036 A * 2/1954 Spalding ................... B01D 1/18
                                                    159/4.02
4,233,114 A * 11/1980 Gastaldi .................... F26B 3/12
                                                    159/4.01
(Continued)

FOREIGN PATENT DOCUMENTS

CN    1351247 A    5/2002
CN    1535756 A    10/2004
(Continued)

OTHER PUBLICATIONS

Translation of CN202105834, accessed Feb. 5, 2016.*
(Continued)

*Primary Examiner* — Duane Smith
*Assistant Examiner* — Phillip Shao
(74) *Attorney, Agent, or Firm* — Westerman, Hattori, Daniels & Adrian, LLP

(57) ABSTRACT

A spray drying apparatus includes a gas inlet provided on a side wall in the vicinity of a top portion of the spray drying apparatus, for introducing a flue gas for drying a spray liquid of a dehydration filtrate; a rectifying plate provided in a spray drying apparatus main body, for decelerating the introduced flue gas so as to alter the flue gas flow to a laminar flow; a spray nozzle for spraying the dehydration filtrate emitted from the desulfurization waste water into the flue gas altered to the laminar flow; a gas outlet provided in the vicinity of a bottom portion of the spray drying apparatus main body, for discharging the flue gas contributed to drying of the dehydration filtrate; and a discharge hopper provided (Continued)

on the bottom portion side of the spray drying apparatus main body, for discharging an ash as a spray-dried solid.

10 Claims, 6 Drawing Sheets

(51) Int. Cl.

| | |
|---|---|
| *C02F 1/04* | (2006.01) |
| *C02F 1/12* | (2006.01) |
| *B01D 53/50* | (2006.01) |
| *F26B 3/12* | (2006.01) |
| *F23J 15/00* | (2006.01) |
| *B01J 2/04* | (2006.01) |
| *C02F 103/18* | (2006.01) |

(52) U.S. Cl.

CPC ................. *C02F 1/048* (2013.01); *C02F 1/12* (2013.01); *F23J 15/006* (2013.01); *F26B 3/12* (2013.01); *B01D 2251/206* (2013.01); *B01D 2251/404* (2013.01); *B01D 2257/404* (2013.01); *B01D 2257/602* (2013.01); *B01D 2258/0283* (2013.01); *C02F 2103/18* (2013.01); *F23J 2215/20* (2013.01); *F23J 2219/60* (2013.01)

(56) References Cited

U.S. PATENT DOCUMENTS

| | | | | |
|---|---|---|---|---|
| 4,322,393 | A | 3/1982 | Gleason et al. | |
| 4,944,250 | A * | 7/1990 | Seshamani | B04C 5/08 122/20 B |
| 5,139,612 | A * | 8/1992 | Andersen | B01D 1/18 159/16.1 |
| 5,227,018 | A * | 7/1993 | Bro | F26B 3/12 159/16.1 |
| 2003/0180283 | A1 * | 9/2003 | Batycky | A61K 9/0075 424/130.1 |

FOREIGN PATENT DOCUMENTS

| | | | |
|---|---|---|---|
| CN | 202105834 | U * | 1/2012 |
| EP | 0049585 | A1 | 4/1982 |
| JP | 57-35741 | U | 2/1982 |
| JP | 63-200818 | A | 8/1988 |
| JP | 03-098926 | U | 10/1991 |
| JP | 05-057141 | A | 3/1993 |
| JP | 05-212369 | A | 8/1993 |
| JP | 06-142447 | A | 5/1994 |
| JP | 09-066201 | A | 3/1997 |
| JP | 09-313881 | A | 12/1997 |
| JP | 2011-122501 | A | 6/2011 |
| WO | 2012165509 | A1 | 12/2012 |

OTHER PUBLICATIONS

Concise explanation of relevance of Japanese Patent Publication No. 63-200818.

Extended European Search Report dated Oct. 6, 2014, issued in corresponding European Application No. 12793771.2. (7 pages).

Translation of Written Opinion dated Sep. 18, 2012, issued in counterpart International Application No. PCT/JP2012/063996 (3 pages).

Office Action dated Feb. 3, 2015, issued in corresponding Chinese Application No. 201280024651.3, w/English translation. (19 pages).

Office Action dated Feb. 25, 2015, issued in corresponding Korean Application No. 10-2013-7031134, w/English translation. (14 pages).

International Search Report of PCT/JP2012/063996, mailing date of Sep. 18, 2012.

Written Opinion of PCT/JP2012/063996, mailing date of Sep. 28, 2012.

Decision of a Patent Grant dated Jan. 19, 2016, issued in counterpart Japanese Patent Application No. 2011-122501, with Partial English translation. (3 pages).

* cited by examiner

SPRAY DRYING APPARATUS OF
DEHYDRATION FILTRATE FROM
DESULFURIZATION WASTE WATER, AND
AIR POLLUTION CONTROL SYSTEM

FIELD

The present invention relates to a spray drying apparatus of dehydration filtrate from desulfurization waste water generated during air pollution control that controls a flue gas discharged from a boiler, and an air pollution control system.

BACKGROUND

Hitherto, an air pollution control system for controlling the flue gas discharged from the boiler installed in thermal power plants and the like has been known. The air pollution control system includes a denitration device configured to remove nitrogen oxide from the flue gas emitted from the boiler, an air heater configured to recover the heat of the flue gas passing through the denitration device, a precipitator configured to remove the soot in the flue gas after heat recovery, and a desulfurization device for removing sulfur oxide in the flue gas after the dust removal. As the desulfurization device, a wet desulfurization device configured to remove the sulfur oxide in the flue gas by bringing a limestone absorbent or the like into gas-liquid contact with the flue gas has been generally used.

Waste water discharged from the wet desulfurization device (hereinafter, referred to as "desulfurization waste water") contains various kinds of harmful substances, for example, ions such as chloride ions and ammonium ions, and mercury in a large quantity. For this reason, although it is necessary to remove these harmful substances from the desulfurization waste water before the desulfurization waste water is discharged to the outside of the system, there are problems in that the removal process of various kinds of harmful substances contained in the desulfurization waste water is complicated, and the processing cost is high. Therefore, in order to save the processing cost of the desulfurization waste water, a method of reusing the desulfurization waste water in the system without discharging to the outside of the system has been suggested. For example, Patent Literatures 1 and 2 disclose an air pollution control device having a configuration in which equipment branched from a flue of a main line, to which a denitration device, an air heater, a precipitator, and a desulfurization device are connected, to gasify the desulfurization waste water by spraying is separately installed, and after the harmful substances are precipitated by introducing a part of the flue gas from the flue gas duct of the main line into the equipment and spraying the desulfurization waste water in the flue gas in the equipment to evaporate the flue gas, the flue gas is returned to the flue gas duct of the main line (Patent Literatures 1 and 2).

CITATION LIST

Patent Literature

Patent Literature 1: Japanese Patent Application Laid-open No. 63-200818
Patent Literature 2: Japanese Patent Application Laid-open No. 9-313881

SUMMARY

Technical Problem

However, in the air pollution control device of Patent Literatures 1 and 2, although the desulfurization waste water is evaporated by providing the equipment configured to partially branch the flue gas from the flue gas duct to spray the desulfurization waste water (or waste water) emitted from the desulfurization device so as to be gasified, since the desulfurization waste water emitted from the desulfurization device contains solid contents, there is a problem in that it is not possible to satisfactorily perform the spray drying.

In addition, in recent years, for environmental consideration of aquatic resources in an inland or the like, non-waste water in the air pollution control equipment has been desired earnestly, and an appearance of the air pollution control equipment capable of being stably operated and promoting non-waste water has been desired earnestly.

As the equipment configured to carry out non-waste water, a spray dryer configured to dry the desulfurization waste water can be used, but in the case of performing spray-drying of the desulfurization waste water using the flue gas of the boiler, there are following problems.

Since a high concentration of ash is contained in the flue gas of the boiler, and a large quantity of precipitated salts contained in the waste water exists when the desulfurization waste water is evaporated, there is a need for measures thereof.

In view of the above problems, an object of the invention is to provide a spray drying apparatus of dehydration filtrate from desulfurization waste water capable of promoting non-waste water from a desulfurization device, and an air pollution control device.

Solution to Problem

According a first aspect of the present invention in order to solve the above-problems, there is provided a spray drying apparatus of dehydration filtrate from desulfurization waste water including: a gas inlet provided on a side wall in the vicinity of a top portion of a spray drying apparatus main body, for introducing a flue gas for drying a spray liquid; a rectifying plate provided in the spray drying apparatus main body, for decelerating the introduced flue gas so as to alter the flue gas flow to a laminar flow; a spray nozzle for spraying the dehydration filtrate emitted from the desulfurization waste water into the flue gas altered to the laminar flow; a gas outlet provided on a side wall in the vicinity of a bottom portion of the spray drying apparatus main body, for discharging the flue gas contributed to drying of the dehydration filtrate; and a solid discharging means provided on the bottom portion of the spray drying apparatus main body, for discharging a spray-dried solid.

According a second aspect of the present invention, there is provided the spray drying apparatus of dehydration filtrate from desulfurization waste water according to the first aspect, further including: a protective plate provided in the vicinity of a flue gas introduction region in the spray drying apparatus main body, for preventing wear of an inner wall surface due to a solid content in the flue gas.

According a second aspect of the present invention, there is provided the spray drying apparatus of dehydration filtrate from desulfurization waste water according to the first or second aspect, further including: a cleaning means for cleaning an inner wall circumferential surface of the spray drying apparatus.

According a second aspect of the present invention, there is provided an air pollution control system including: a boiler for combusting fuel; an air heater for recovering heat of a flue gas from the boiler; a precipitator for removing soot in the flue gas after heat recovery; a desulfurization device for removing sulfur oxide contained in the flue gas after dust removal by an absorbent; a dehydrator for removing a gypsum from a desulfurization waste water to be discharged from the desulfurization device; the spray drying apparatus according to any one of the first to third aspects including a spray means for spraying the dehydration filtrate from the dehydrator; and a flue gas introduction line for introducing a part of the flue gas into the spray drying apparatus.

Advantageous Effects of Invention

According to the invention, in the spray drying apparatus, by altering the flue gas to a laminar flow, and spraying the dehydration filtrate generated from the desulfurization waste water into the flue gas altered to the laminar flow from a spray nozzle, the spray drying of the dehydration filtrate is satisfactorily performed. At this time, the wear due to the flue gas to be introduced is protected by a protective plate.

Furthermore, by having a cleaning means for cleaning the interior of the spray drying apparatus, a high concentration of ash in the flue gas and a large quantity of precipitated salts after spray drying is cleaned to prevent an occurrence of scale on the interior of the wall surface.

BRIEF DESCRIPTION OF DRAWINGS

FIG. 3-1 is a schematic cross-sectional diagram taken along line A-A of FIG. 2, illustrating an installation state of a first protective plate provided on a top portion side of the spray drying apparatus.

FIG. 3-2 is an enlarged diagram of a part C of FIG. 3-1.

FIG. 4-1 is a schematic cross-sectional diagram taken along line B-B of FIG. 2, illustrating an installation state of a second protective plate provided on a bottom portion side of the spray drying apparatus.

FIG. 4-2 is an enlarged diagram of a part D of FIG. 4-1.

DESCRIPTION OF EMBODIMENTS

The invention will be described below in detail with reference to the accompanying drawings. In addition, the invention is not limited to the embodiments, and when there are a plurality of embodiments, a combined configuration of each embodiment is also included. Furthermore, constituent elements in the embodiments described below include elements capable of being easily assumed by those of ordinary skill in the art or substantially identical elements.

First Embodiment

Figure 1:
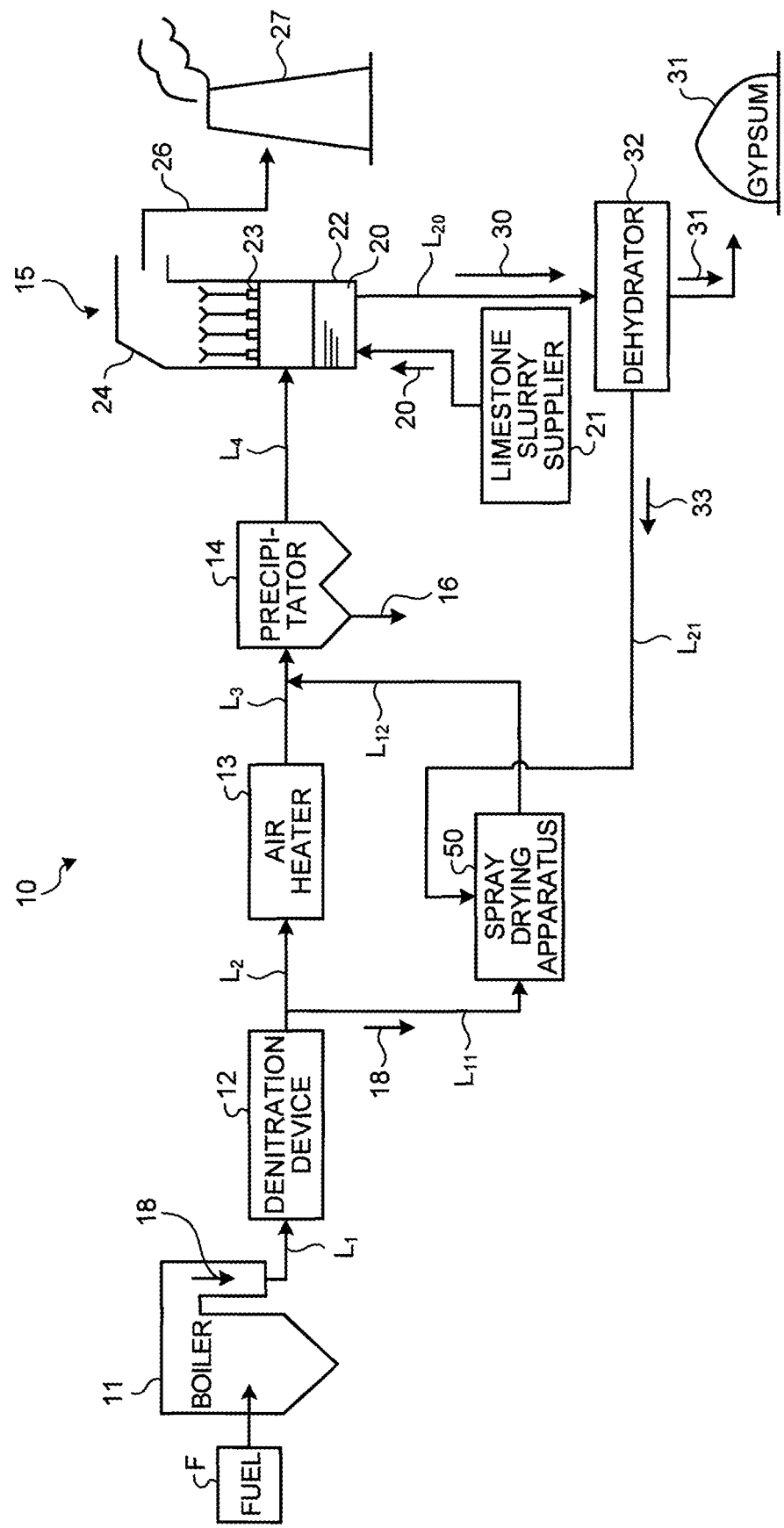
FIG. 1 is a schematic configuration diagram of an air pollution control system according to a first embodiment.

FIG. 1 is a schematic configuration diagram of an air pollution control system according to the first embodiment.

An air pollution control system 10 illustrated in FIG. 1 is an apparatus that removes harmful substances such as nitrogen oxide ($NO_x$), sulfur oxide ($SO_x$), and mercury (Hg) from a flue gas 18 emitted from a boiler 11 such as a coal combustion boiler which uses coal as fuel, and a heavy oil combustion boiler which uses heavy oil as fuel.

The air pollution control system 10 includes the boiler 11 that combusts the fuel F, a denitration device 12 that removes nitrogen oxide in the flue gas 18 from the boiler 11, an air heater 13 that recovers the heat of the flue gas 18 after denitration, a precipitator 14 that removes the soot in the flue gas 18 after heat recovery, a desulfurization device 15 that removes the sulfur oxide contained in the flue gas 18 after the dust removal by a limestone slurry 20 serving as an absorbent, a dehydrator 32 that removes a gypsum 31 from a desulfurization waste water 30 discharged from the desulfurization device 15, a spray drying apparatus 50 (spray drying apparatuses 50A to 50C as will be described below) including a spray means for spraying a dehydration filtrate 33 emitted from the dehydrator 32, and a flue gas introduction line $L_{11}$ that introduces a part of the flue gas 18 into the spray drying apparatus 50. Thus, it is possible to stably perform non-waste water of the desulfurization waste water 30 in the spray drying apparatus 50 through the spray drying, by the use of the flue gas 18 into which the dehydration filtrate 33 obtained by removing the gypsum 31 is introduced.

The denitration device 12 is a device that removes the nitrogen oxide in flue gas to be supplied from the boiler 11 via the gas supply line $L_1$, and has a denitration catalyst layer (not illustrated) therein. A reducing agent injector (not illustrated) is arranged on the upstream side of the denitration catalyst layer, and a reducing agent is injected into the flue gas 18 from the reducing agent injector. Herein, as the reducing agent, for example, ammonia, urea, and ammonium chloride and the like are used. The nitrogen oxide in the flue gas 18 introduced into the denitration device 12 comes into contact with the denitration catalyst layer, and thus, the nitrogen oxide in the flue gas 18 is decomposed and removed to nitrogen gas ($N_2$) and water ($H_2O$). Furthermore, in mercury in flue gas 18, when chlorine (Cl) increases, a ratio of divalent mercuric chloride soluble in the water increases, and the mercury is easily collected in the desulfurization device 15 described below.

In addition, the denitration device 12 described above is not essential, and in a case where the concentration of nitrogen oxide and the concentration of mercury in the flue gas 18 emitted from the boiler 11 are present in trace quantities, or in a case where these substances are not contained in the flue gas 18, the denitration device 12 may not be provided.

The air heater 13 is a heat exchanger that recovers the heat of the flue gas 18 to be supplied via a flue gas supply line $L_2$ after the nitrogen oxide has been removed by the denitration device 12. Since the temperature of the flue gas 18 passing through the denitration device 12 is as high as about 300° C. to 400° C., the heat-exchange between the flue gas 18 of a high temperature and the combustion air of a room temperature is performed by the air heater 13. The combustion air heated to a high temperature by the heat-exchange is supplied to the boiler 11. On the other hand, the flue gas 18 subjected to the heat-exchange with the combustion air of the room temperature is cooled to about 150° C.

The precipitator 14 removes the soot in the flue gas 18 to be supplied via a gas supply line $L_3$ after the heat recovery. As the precipitator 14, an inertia precipitator, a centrifugal precipitator, a filtration type precipitator, an electronic precipitator, a cleaning precipitator and the like are adapted, but the precipitator 14 is not particularly limited thereto. In addition, reference numeral 16 in FIG. 1 illustrates a fly ash.

The desulfurization device 15 is a device that removes the sulfur oxide in the flue gas 18 to be supplied via a gas supply line $L_4$ by a wet process after the soot is removed. In the desulfurization device 15, the limestone slurry 20 (aqueous solution in which the limestone powder is dissolved in water) is used as the alkaline absorbent, and the temperature in the device is adjusted to about 30 to 80° C. The limestone slurry 20 is supplied to a tower bottom portion 22 of the desulfurization device 15 from a limestone slurry supplier 21. The limestone slurry 20 supplied to the tower bottom portion 22 of the desulfurization device 15 is sent to a plurality of nozzles 23 in the desulfurization device 15 via an absorbent supply line (not illustrated), and is ejected toward a tower top portion 24 side from the nozzle 23. By the gas-liquid contact of the flue gas 18 rising from the tower bottom portion 22 side of the desulfurization device 15 with the limestone slurry 20 ejected from the nozzle 23, sulfur oxide and mercuric chloride in the flue gas 18 are absorbed by the limestone slurry 20, and are separated and removed from the flue gas 18. The flue gas 18 purified by the limestone slurry 20 is discharged from the tower top portion 24 side of the desulfurization device 15 as a purge gas 26, and is discharged to the outside of the system from a stack 27.

Within the desulfurization device 15, the sulfur oxide $SO_x$ in the flue gas 18 and the limestone slurry 20 produce a reaction represented by the following formula (1).

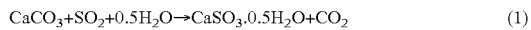

$$CaCO_3+SO_2+0.5H_2O \rightarrow CaSO_3.0.5H_2O+CO_2 \quad (1)$$

Furthermore, the limestone slurry 20 absorbing $SO_x$ in the flue gas 18 is further oxidized by air (not illustrated) to be supplied to the tower bottom portion 22 of the desulfurization device 15, and the limestone slurry 20 and air produce a reaction represented by the following formula (2).

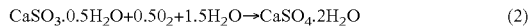

$$CaSO_3.0.5H_2O+0.5O_2+1.5H_2O \rightarrow CaSO_4.2H_2O \quad (2)$$

In this way, $SO_x$ in the flue gas 18 is captured in the form of gypsum $CaSO_4.2H_2O$ in the desulfurization device 15.

Furthermore, as described above, as the limestone slurry 20, one obtained by pumping the liquid stored in the tower bottom portion 22 of the desulfurization device 15 is used, but as a result of the operation of the desulfurization device 15, gypsum $CaSO_4.2H_2O$ is mixed with the pumped limestone slurry 20 by the reaction formulae (1) and (2). Hereinbelow, the pumped limestone gypsum slurry (limestone slurry mixed with gypsum) will be referred to as an absorbent.

The absorbent (limestone gypsum slurry) used in the desulfurization is discharged as the desulfurization waste water 30 to the outside from the tower bottom portion 22 of the desulfurization device 15, is sent to the dehydrator 32 via a waste water line $L_{20}$ described below, and is dehydrated here. The desulfurization waste water 30 contains heavy metals such as mercury, and halogen ions such as $Cl^-$, $Br^-$, $I^-$, and $F^-$, in addition to the gypsum 31.

The dehydrator 32 separates the solid content containing the gypsum 31 in the desulfurization waste water 30 and the dehydration filtrate 33 of the liquid content. As the dehydrator 32, for example, a belt filter, a centrifuge, a decanter type centrifugal settler or the like is used. The gypsum 31 is separated from the desulfurization waste water 30 discharged from the desulfurization device 15, by the dehydrator 32. At that time, mercuric chloride in the desulfurization waste water 30 is separated from the liquid together with the gypsum 31 while being adsorbed to the gypsum 31. The separated gypsum 31 is discharged to the outside of the system (hereinafter, referred to as "outside of the system").

Meanwhile, the dehydration filtrate 33 as the separated liquid is sent to the spray drying apparatus 50 via a dehydration line $L_{21}$. In addition, the dehydration filtrate 33 may also be temporarily stored in a waste water tank (not illustrated).

The spray drying apparatus 50 includes a gas introduction means into which a part of the flue gas 18 is introduced via the flue gas introduction line $L_{11}$ branched from the flue gas supply line $L_2$ which is a main line of the flue gas 18 emitted from the boiler 11, and a spray means for scattering or spraying the dehydration filtrate 33. Moreover, the spray drying apparatus 50 evaporates and dries the dehydration filtrate 33 scattered or sprayed by the heat of the introduced flue gas 18. In addition, reference numeral $L_{12}$ is a flue gas feeding line that feeds the flue gas 18 contributed to drying in the spray drying apparatus 50 to the gas supply line $L_3$.

In the invention, since the dehydration filtrate 33 obtained by removing the gypsum 31 from the desulfurization waste water 30 is sprayed and dried, it is possible to prevent clogging of the spray means.

That is, since the desulfurization waste water itself is not sprayed, it is possible to reduce significantly the quantity of dry particles generated due to evaporation of the desulfurization waste water. As a result, it is possible to reduce clogging due to the attachment of the dried particles. Furthermore, since the gypsum 31 and mercury chloride are also separated and removed by the dehydration treatment of the desulfurization waste water 30, it is possible to prevent an increase in concentration of mercury in the flue gas 18 at the time of spraying the waste water.

Furthermore, in this embodiment, since a part of the flue gas 18 flowing into the air heater 13 is branched from the flue gas supply line $L_2$ via the flue gas introduction line $L_{11}$, the temperature of the flue gas rises (350 to 400° C.), and it is possible to efficiently perform the spray drying of the dehydration filtrate 33.

Figure 2:
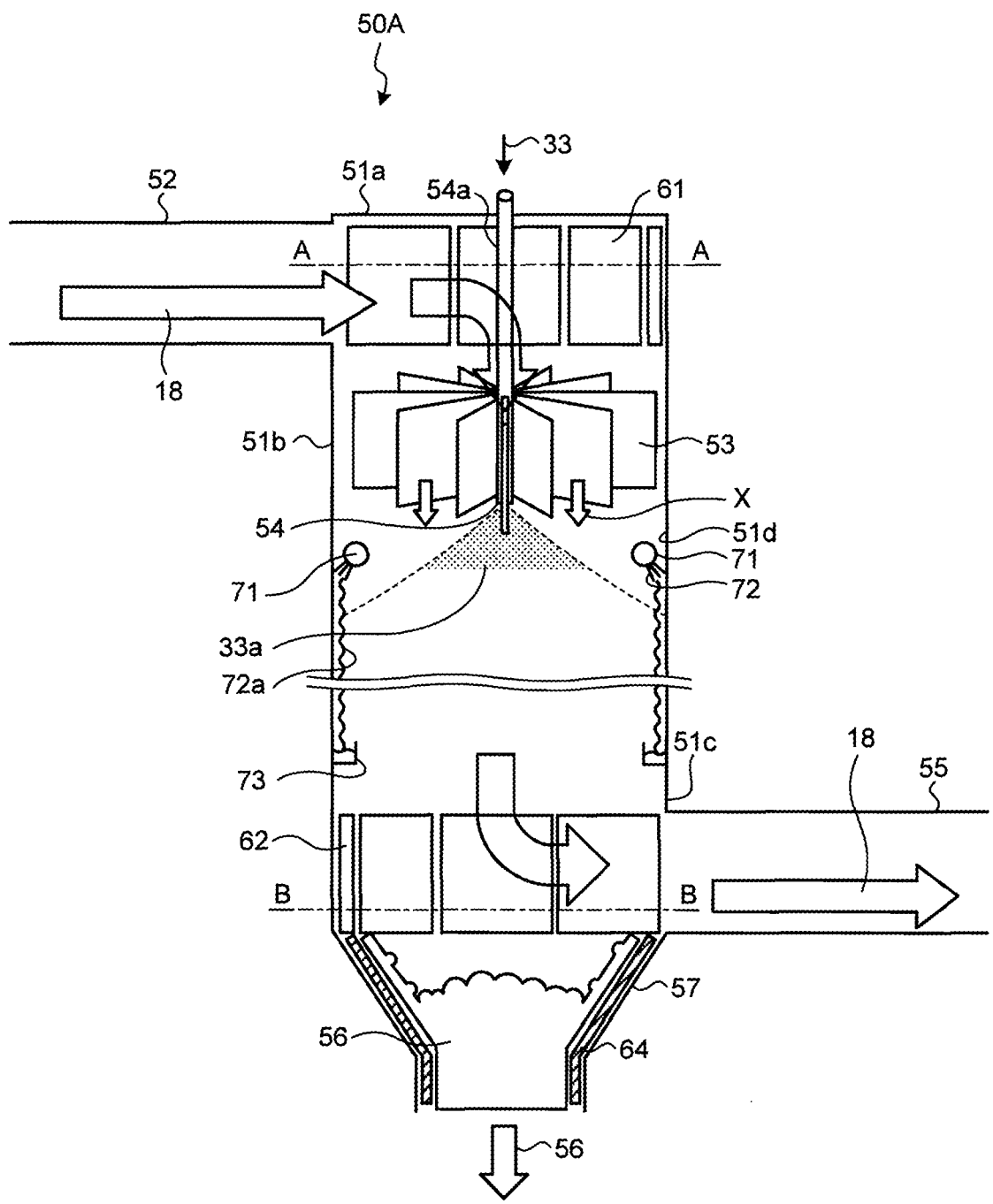
FIG. 2 is a schematic diagram of a spray drying apparatus of dehydration filtrate from desulfurization waste water according to the first embodiment.

FIG. 2 is a schematic diagram of a spray drying apparatus of dehydration filtrate from desulfurization waste water according to this embodiment.

As illustrated in FIG. 2, the spray drying apparatus 50A of the embodiment includes a gas inlet 52 that is provided on a side wall 51b in the vicinity of a top (cover) portion 51a of the spray drying apparatus main body to introduce the flue gas 18 for drying a spray liquid 33a of the dehydration filtrate 33, a rectifying plate 53 that is provided in the spray drying apparatus main body to decelerate the introduced flue gas 18 and alter the flue gas flow to a laminar flow X, a spray nozzle 54 that sprays the dehydration filtrate 33 from the desulfurization waste water 30 into the flue gas 18 altered to the laminar flow X, and a gas outlet 55 that connects the bottom portion of the spray drying apparatus main body with a gas supply line $L_3$ serving as a main flue of the flue gas 18. In addition, reference numeral 56 illustrates an ash that is a spray-dried solid.

Furthermore, in this embodiment, in each of an introduction region of the flue gas 18 within the main body of the spray drying apparatus 50A and a discharge region of the flue gas 18 contributed to drying, a first protective plate 61 and a second protective plate 62, which prevent the wear of an inner wall surface 51d due to the solid content in the flue gas 18, are provided along the wall.

Since a flow velocity of the flue gas 18 to be introduced is, for example, approximately 10 to 18 m/s, and the flue gas 18 is introduced from a tangential direction of the apparatus main body, the wear of the inner wall surface 51*d* is prevented by installing the first protective plate 61.

Figures 1, 3:
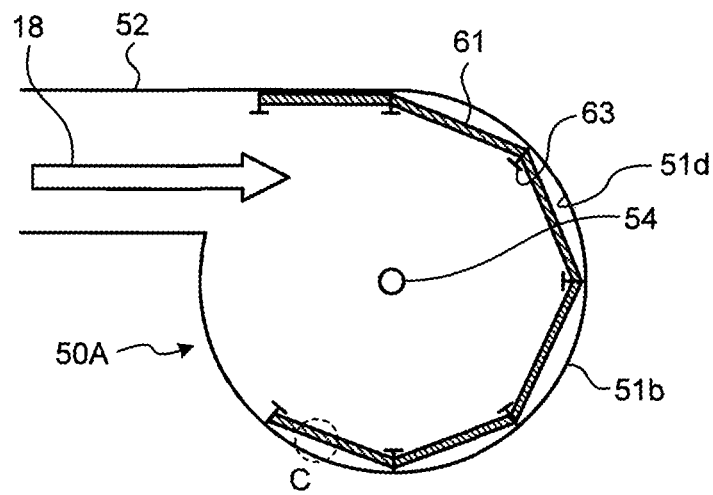
Figures 2, 3:
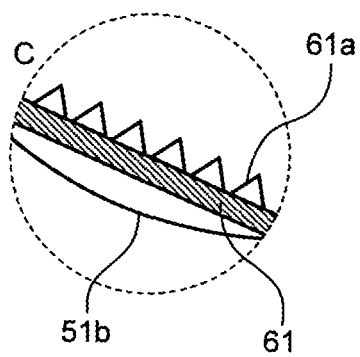

FIG. 3-1 is a schematic cross-sectional diagram taken along line A-A of FIG. 2, illustrating an installation state of the first protective plate 61 provided on the top portion side of the spray drying apparatus. FIG. 3-2 is an enlarged diagram of a C part thereof.

Figures 1, 4:
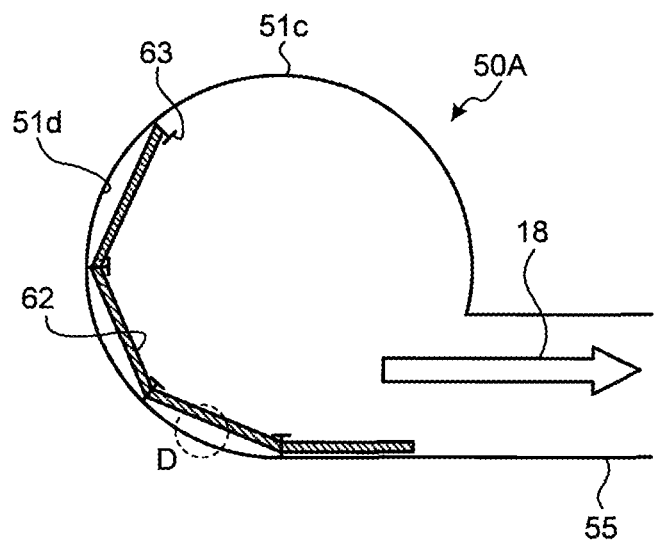
Figures 2, 4:
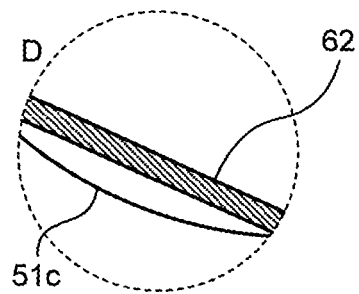

FIG. 4-1 is a schematic cross-sectional diagram taken along line B-B of FIG. 2, illustrating an installation state of the second protective plate 62 provided on the bottom portion side of the spray drying apparatus. FIG. 4-2 is an enlarged diagram of a part D thereof.

As illustrated in FIGS. 3-1 and 3-2, for example, a rail-shaped insertion jig 63 is provided on the inner wall surface 51*d* of the main body of the spray drying apparatus 50A. Moreover, the first protective plate 61 is easily pulled out with respect to the insertion jig 63 in the vertical axis direction, and is replaceable as needed.

The reason is that a lot of soot such as ash having the high hardness is contained in the flue gas 18 emitted from the boiler 11. Furthermore, the reason is that it is necessary to protect the inner wall surface 51*d* from the wear due to the ash having the high hardness generated during collision by a swirling flow that occurs when the flue gas 18 flows from the gas inlet 52. For this reason, the first protective plate 61 to be freely inserted is provided along the periphery of the inner wall surface 51*d*.

In addition, regarding the introduction of the flue gas 18, the flue gas 18 is introduced into the spray drying apparatus 50A by a difference in pressure loss between the flue gas supply line $L_2$ and the flue gas introduction line $L_{11}$, or the flue gas 18 is introduced using an induction fan or the like as necessary.

Furthermore, as illustrated in FIG. 3-2, a corrugated surface 61*a* is further formed on the surface of the first protective plate 61 to decelerate the flow of the flue gas 18 by the corrugated surface 61*a*.

In this embodiment, the corrugated surface 61*a* as a deceleration means is formed on the first protective plate 61, but the invention is not limited thereto, and the gas deceleration means may be provided independently and separately.

In order to further weaken the vortex flow of the flue gas 18 colliding with the first protective plate 61, the rectifying plate 53 is provided.

The rectifying plate 53 according to this embodiment is provided by a support means (not illustrated) around a supply pipe 54*a* of the dehydration filtrate 33 to be supplied to the spray nozzle 54 and radially therefrom. Moreover, the flue gas 18 is altered from the vortex flow (swirling flow) to a downward flow of the laminar flow X by the rectifying plate 53.

In addition, the rectifying plate 53 may also be provided on the inner wall surface 51*d* side in the vertical axis direction.

The dehydration filtrate 33 is ejected as the spray liquid 33*a* from the spray nozzle 54 into the flue gas 18 altered to the laminar flow X.

Herein, as long as the spray nozzle 54 sprays the dehydration filtrate 33 so as to have a predetermined droplet diameter, the type thereof is not limited. For example, it is possible to use a spray means such as a two-fluid nozzle and a rotary atomizer. In addition, the two-fluid nozzle is suitable for spraying a relatively small amount of the dehydration filtrate 33, and the rotary atomizer is suitable for spraying a relatively large amount of the dehydration filtrate 33.

Furthermore, the number of nozzles is not one group, and it may be possible to provide several groups depending on the processing quantity thereof.

In this embodiment, a cleaning means for cleaning an inner wall circumferential surface of the spray drying apparatus 50A is included.

The cleaning means has a cleaning nozzle 71 that injects a cleaning liquid 72 throughout the inner wall surface 51*d* to form a wet wall 72*a*, and a recovery trough 73 that recovers the dropped liquid of the wet wall 72*a*.

The wet wall 72*a* is formed throughout the inner wall surface 51*d* to prevent the occurrence of deposits precipitated from the flue gas 18 and the dehydration filtrate 33.

The cleaning means may be installed as necessary, and when there is little occurrence of deposits, the cleaning means may be excluded.

In addition, since a spray drying region in the tower of the spray drying apparatus 50A is the desulfurization filtrate having a high boiling point as compared to general water so that drying of the spray liquid 33*a* to be sprayed from the spray nozzle 54 is satisfactorily performed, the length thereof is changed in accordance with the evaporation rate of the dehydration filtrate to increase a residence time of the spray liquid 33*a*.

The flue gas 18 contributed to the spray drying is discharged from the gas outlet 55 provided on a side wall 51*c* in the vicinity of the bottom portion of the spray drying apparatus 50A.

At this time, in order to prevent the wear of the inner wall surface 51*d* at the time of being altered from the laminar flow X in the vertical axis direction to the vortex flow, as illustrated in FIG. 4-1, a plurality of second protective plates 62 are provided along the wall. In addition, as illustrated in FIG. 4-2, unlike the surface of the first protective plate 61, the surface of the second protective plate 62 has a smooth surface.

In addition, it is also possible to exclude the second protective plate 62 depending on the quantity of soot contained in the flue gas.

In this way, when the dehydration filtrate 33 is sprayed from the spray nozzle 54, the dehydration filtrate 33 comes into contact with the introduced flue gas 18 and is spray-dried, but since various salts are contained in the dehydration filtrate 33, the ash 56 as the spray-dried solid is discharged from a discharge hopper 57 provided on the bottom portion of the spray drying apparatus main body.

In addition, on the inner wall surface of the discharge hopper 57, in order to prevent the corrosion due to the wear between the inner wall surface and the ash 56, it is also possible to provide a third protective plate 64.

In addition, since there is also a case where it is not possible to easily exchange the third protective plate 64 to be installed in the discharge hopper 57, for example, ceramic tiles and the like having durability in corrosive environments such as the wear of the ash and the precipitated salt may be pasted.

According to this embodiment, by altering the flue gas 18 to the laminar flow X by the rectifying plate 53 in the spray drying apparatus 50A, and spraying the dehydration filtrate 33 emitted from the desulfurization waste water 30 from the spray nozzle 54 into the flue gas 18 altered to the laminar flow X, the spray drying of the dehydration filtrate 33 is improved. At this time, since the wear due to the flue gas 18 colliding with the inner wall surface 51*d* at the time of introducing and discharging is protected by the first and second protective plates 61 and 62, the durability of the spray drying apparatus is enhanced.

Furthermore, by having the cleaning means for cleaning the interior of the spray drying apparatus 50A to perform cleaning due to the wet wall 72a, a high concentration of ash in the flue gas 18 and a large quantity of precipitated salts after spray drying can be cleaned to prevent an occurrence of scale inside the wall surface, and thus the durability of the spray drying apparatus 50A is improved.

Second Embodiment

Figure 5:
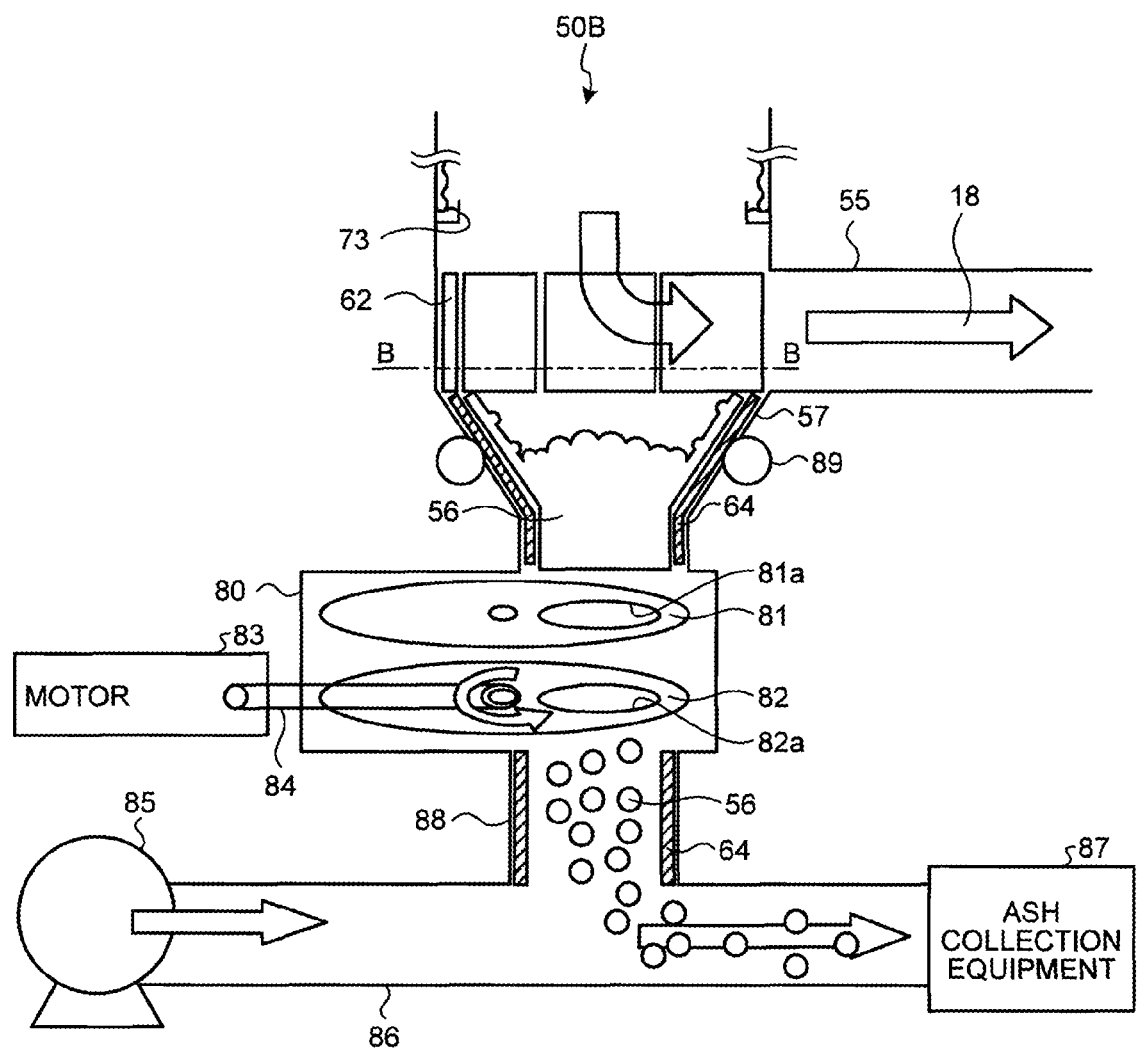
FIG. 5 is a schematic diagram of a spray drying apparatus of dehydration filtrate from desulfurization waste water according to a second embodiment.

FIG. 5 is a schematic diagram of a spray drying apparatus of dehydration filtrate from desulfurization waste water according to a second embodiment. In addition, the same members as the spray drying apparatus 50A of the first embodiment are denoted by the same reference numerals and the descriptions thereof will not be provided.

As illustrated in FIG. 5, in the spray drying apparatus 50B of the present embodiment, on the bottom portion of the spray drying apparatus main body, an ash discharge means 80 for discharging the ash 56 is provided.

The ash discharge means 80 is provided so as to be connected to the discharge hopper 57, and is provided with a stationary platen 81 having an opening 81a therein, and a rotary platen 82 that rotates by the rotation of an endless belt 84 rotating by the drive of a motor 83. The rotary platen 82 is provided with an opening 82a.

Moreover, when the ash 56 reaches a predetermined quantity, the rotary platen 82 is rotated by the endless belt 84 through the drive of the motor 83 to match the openings 81a and 82a and drop the ash 56 to a lower discharge passage 86. A compressor 85 is installed in one end portion of the discharge passage 86 to pump the ash 56 by the compressor 85, so that the ash 56 is sent to ash collection equipment 87 provided on the other end of the discharge passage 86.

On an inner surface of a communicating passage 88 with the ash discharge means 80 interposed thereon, the third protective plate 64 is provided to protect the inner surface of the communicating passage 88.

Furthermore, a vibration device 89 is provided around the discharge hopper 57 to prevent the ash and the precipitated salt from clogging, by vibrating the discharge hopper 57.

Furthermore, the discharge hopper 57, the discharge passage 86, and the communicating passage 88 are provided with a thermal insulation means (for example, steam tracing or the like) to prevent the ash and the precipitated salt from clogging.

Third Embodiment

Figure 6:
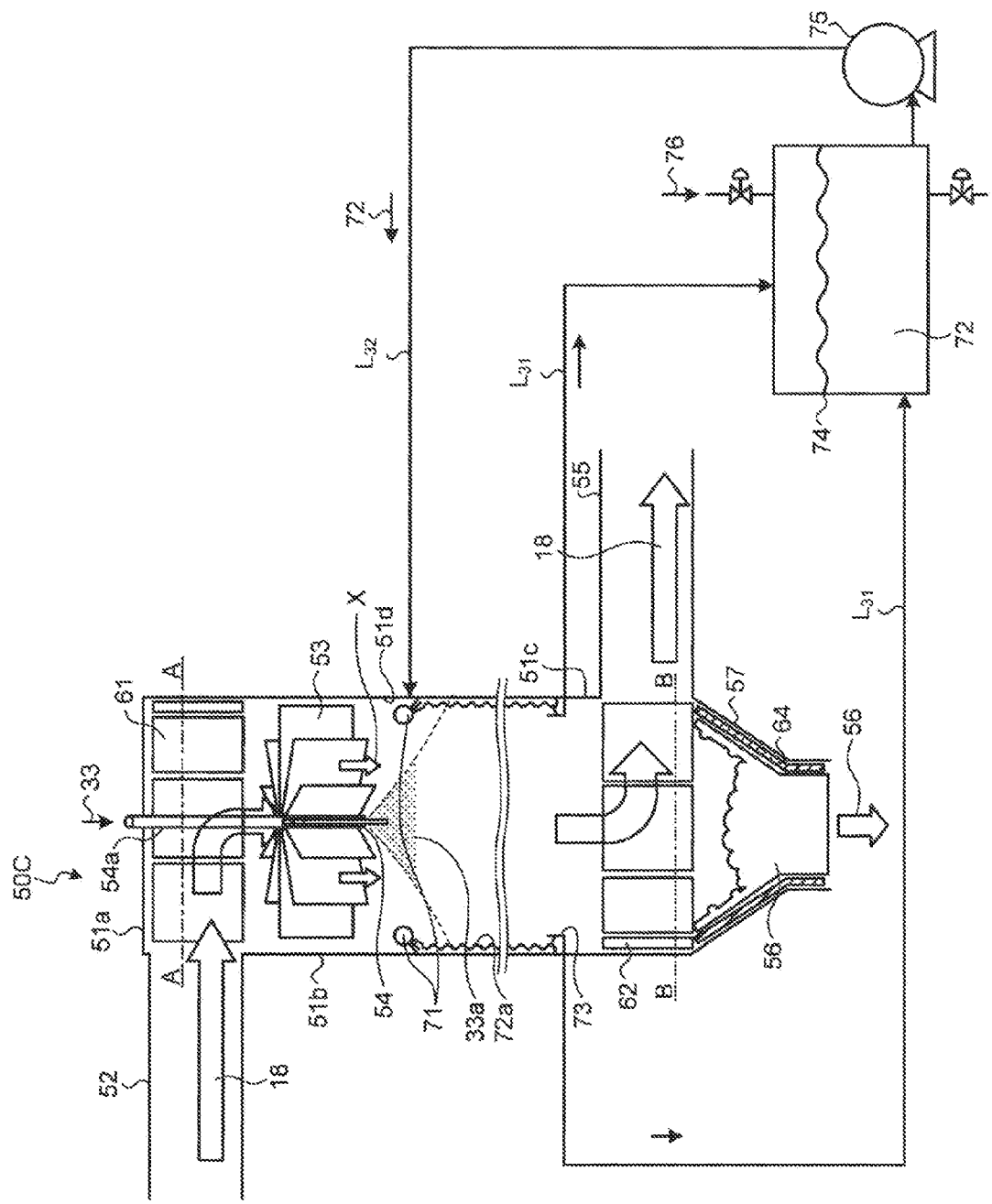
FIG. 6 is a schematic diagram of a spray drying apparatus of dehydration filtrate from desulfurization waste water according to a third embodiment.

FIG. 6 is a schematic diagram of a spray drying apparatus of dehydration filtrate from desulfurization waste water according to a third embodiment. In addition, the same members as the spray drying apparatus 50A of the first embodiment are denoted by the same reference numerals, and the descriptions thereof will not be provided.

As illustrated in FIG. 6, the spray drying apparatus 50C of the present embodiment is provided with a cleaning liquid storage basin 74 that promotes the recovery and the reuse of the cleaning liquid 72 of the cleaning means.

The wet wall 72a formed on the inner surface of the spray drying apparatus main body cleans away the precipitated deposits, the cleaning liquid 72 is recovered in the recovery trough 73, and is recovered to and stored in the cleaning liquid storage basin 74 by a recovery line $L_{31}$, and the cleaning liquid 72 is supplied to the cleaning nozzle 71 again via a cleaning liquid supply line $L_{32}$ by a circulation pump 75.

Furthermore, when cleaning is continued over a long period of time, the concentration of the cleaning liquid 72 rises, so that the cleaning liquid 72 is diluted by appropriately supplying dilution water 76. Furthermore, when the concentration thereof rises to a predetermined level or more, a part of the cleaning liquid 72 is extracted from the cleaning liquid storage basin 74 and is diluted with the dilution water 76 by the extracted quantity, and cleaning is performed again.

REFERENCE SIGNS LIST

10 AIR POLLUTION CONTROL SYSTEM
11 BOILER
12 DENITRATION DEVICE
13 AIR HEATER
14 PRECIPITATOR
15 DESULFURIZATION DEVICE
16 FLY ASH
18 FLUE GAS
30 DESULFURIZATION WASTE WATER
32 DEHYDRATOR
33 DEHYDRATION FILTRATE
50A to 50C SPRAY DRYING APPARATUS
52 GAS INLET
53 RECTIFYING PLATE
54 SPRAY NOZZLE
55 GAS OUTLET
56 ASH
57 DISCHARGE HOPPER

The invention claimed is:

1. A spray drying apparatus of dehydration filtrate from desulfurization waste water comprising:
    a gas inlet that is provided on a side wall in the vicinity of a top portion of a spray drying apparatus main body and introduces a flue gas from a boiler;
    rectifying plates that are provided in the spray drying apparatus main body;
    a spray nozzle that sprays the dehydration filtrate emitted from the desulfurization waste water into the flue gas rectified by the rectifying plates;
    a gas outlet that is provided on a side wall in the vicinity of a bottom portion of the spray drying apparatus main body and discharges the flue gas contributed to drying of the dehydration filtrate; and
    a solid discharging means that is provided on the bottom portion of the spray drying apparatus main body and discharges a spray-dried solid, wherein
    the solid discharging means is provided with a discharge hopper and the discharge hopper is provided with a thermal insulation means.

2. The spray drying apparatus of according to claim 1, further comprising:
    a first protective plate that is provided in the vicinity of a flue gas introduction region in the spray drying apparatus main body and prevents wear of an inner wall surface of the spray drying apparatus main body due to a solid content in the flue gas, wherein
    the first protective plate is provided on and along the inner wall surface.

3. The spray drying apparatus according to claim 1, further comprising:
    a cleaning means that cleans an inner wall circumferential surface of the spray drying apparatus main body.

4. An air pollution control system comprising:
    a boiler that combusts fuel;

an air heater that recovers heat of a flue gas from the boiler;

a precipitator that removes soot in the flue gas after heat recovery;

a desulfurization device that removes sulfur oxide contained in the flue gas after dust removal by an absorbent;

a dehydrator that removes a gypsum from a desulfurization waste water to be discharged from the desulfurization device;

the spray drying apparatus according to claim 1; and a flue gas introduction line that introduces a part of the flue gas into the spray drying apparatus main body.

5. The spray drying apparatus according to claim 1, wherein the thermal insulation means of the discharge hopper is steam tracing.

6. The spray drying apparatus according to claim 2, further comprising: insertion jigs that are provided on the inner wall surface of the spray drying apparatus main body, wherein the first protective plate is provided to be pulled out with respect to the insertion jigs in the vertical axis direction.

7. The spray drying apparatus according to claim 2, wherein a corrugated surface is formed on a surface of the first protective plate.

8. The spray drying apparatus of according to claim 2, further comprising:

a second protective plate that is provided in the vicinity of the gas outlet of the bottom portion of the spray drying apparatus main body and prevents wear of the inner wall surface of the spray drying apparatus main body due to the solid content in the flue gas, wherein the second protective plate is provided on and along the inner wall surface.

9. The spray drying apparatus of according to claim 1, further comprising: a third protective plate that is provided on an inner wall surface of the discharge hopper.

10. The spray drying apparatus of according to claim 1, further comprising:

a supply pipe that is inserted from a top portion into the spray drying apparatus main body and supplies the dehydration filtrate to the spray nozzle, wherein the rectifying plates are vertically and radially provided around the supply pipe.

* * * * *